United States Patent
Rollmann et al.

(10) Patent No.: US 11,873,864 B2
(45) Date of Patent: Jan. 16, 2024

(54) METHOD FOR INCREASING THE LOAD-BEARING CAPACITY, AND ROLLING DEVICE FOR HARD ROLLING A SURFACE-HARDENED ROLLING-BEARING RACEWAY

(71) Applicants: thyssenkrupp rothe erde Germany GmbH, Dortmund (DE); thyssenkrupp AG, Essen (DE)

(72) Inventors: Joerg Rollmann, Lippstadt (DE); Thomas Handreck, Anroechte (DE); Bernd Lueneburg, Muelheim (DE); Matthias Toefke, Lippstadt (DE); Christian Liewen, Lippstadt (DE)

(73) Assignees: thyssenkrupp rothe erde Germany GmbH, Dortmund (DE); thyssenkrupp AG, Essen (DE)

( * ) Notice: Subject to any disclaimer, the term of this patent is extended or adjusted under 35 U.S.C. 154(b) by 0 days.

(21) Appl. No.: 17/782,126

(22) PCT Filed: Nov. 26, 2020

(86) PCT No.: PCT/EP2020/083446
§ 371 (c)(1),
(2) Date: Jun. 2, 2022

(87) PCT Pub. No.: WO2021/110519
PCT Pub. Date: Jun. 10, 2021

(65) Prior Publication Data
US 2022/0412407 A1     Dec. 29, 2022

(30) Foreign Application Priority Data

Dec. 3, 2019    (DE) ..................... 10 2019 218 794.3

(51) Int. Cl.
*F16C 33/64*      (2006.01)
*B21H 1/12*      (2006.01)
(Continued)

(52) U.S. Cl.
CPC ............... *F16C 33/64* (2013.01); *B21H 1/12* (2013.01); *C21D 9/40* (2013.01); *F16C 19/386* (2013.01);
(Continued)

(58) Field of Classification Search
CPC .... F16C 33/64; F16C 19/386; F16C 2220/44; F16C 2223/10; F16C 2240/18; B21H 1/12; C21D 9/40
See application file for complete search history.

(56) References Cited

U.S. PATENT DOCUMENTS

| | | | |
|---|---|---|---|
| 3,791,706 A | 2/1974 | Dobson | |
| 6,478,893 B1 * | 11/2002 | Takemura | ................ C21D 9/36 384/492 |

(Continued)

FOREIGN PATENT DOCUMENTS

| | | |
|---|---|---|
| DE | 10 2015 201 664 A1 | 8/2016 |
| DE | 10 2015 207 779 A1 | 11/2016 |

(Continued)

OTHER PUBLICATIONS

English translation of JP-H06109021-A (Year: 1994).*

(Continued)

*Primary Examiner* — Jacob J Cigna
(74) *Attorney, Agent, or Firm* — thyssenkrupp North America, LLC

(57) ABSTRACT

A method for increasing load capacity of a surface-hardened rolling bearing raceway of a rolling bearing ring element may involve providing a rolling bearing ring element with an unhardened core region and, at least in certain portions, an outer layer hardened to a surface hardening depth. A rolling bearing raceway may be formed in a region of the hardened outer layer. The method may further involve hard rolling the rolling bearing raceway with a roll. The diameter (Continued)

of the roll is 8 to 25 times the surface hardening depth. A surface pressure prevailing in a rolling contact between the roll and the rolling bearing raceway during the hard rolling is between 2000 MPa and 3300 MPa. The method further involves machining the rolling bearing raceway after the hard rolling.

11 Claims, 5 Drawing Sheets

(51) Int. Cl.
*C21D 9/40* (2006.01)
*F16C 19/38* (2006.01)
(52) U.S. Cl.
CPC ...... *F16C 2220/44* (2013.01); *F16C 2223/10* (2013.01); *F16C 2240/18* (2013.01); *F16C 2360/31* (2013.01)

(56) References Cited

U.S. PATENT DOCUMENTS

| | | | |
|---|---|---|---|
| 2014/0212082 A1 | 7/2014 | Gegner et al. | |
| 2015/0036960 A1 | 2/2015 | Gegner et al. | |
| 2018/0156275 A1 | 6/2018 | Beer et al. | |

FOREIGN PATENT DOCUMENTS

| | | | | |
|---|---|---|---|---|
| DE | 10 2016 114 895 A1 | 2/2018 | | |
| EP | 1 505 306 A1 | 2/2005 | | |
| EP | 2 759 729 A1 | 7/2014 | | |
| EP | 2 771 585 A1 | 9/2014 | | |
| JP | H06109021 A | * | 4/1994 | .......... F16C 2240/54 |
| JP | H09-314462 A | 12/1997 | | |
| WO | 2018/029255 A1 | 2/2018 | | |
| WO | 2019/057242 A1 | 3/2019 | | |

OTHER PUBLICATIONS

Zwirlein et al., Case Depth for Induction Hardened Slewing Bearing Rings, SAE Technical Paper Series 831371, 17 pps. (1983).
Brändlein et al., Die Wälzlagerpraxis, Handbuch für die Berechnung und Gestaltung von Lagerungen, Vereinigte Fachverlage GmbH, Mainz (1995).
DIN ISO 76: International Standard—Rolling bearings—Static load ratings, Mevius (2019).
Schwingfestigkeitsberechnung von induktiv randschichtgehärteten bauteilähnlichen Proben und Verifikation im Versuch, Masterarbeit TKRE (1989). (Vibration resistance calculation of inductively surface-hardened component-like samples and verification in experiments, master thesis TKRE).
H. Fahry et al., Entstehung von Eigenspannungen und Verzügen bei der induktiven Randschichthärtung von Bauteilen, Härtereitechnische Mitteilungen 44, Nr. 3, pp. 149-156 (1989).
FKM-Richtlinie, Rechnerischer Festigkeitsnachweis für Maschinenbauteile aus Stahl, Eisenguss und Aluminiumwerkstoffen, 5. überarbeitete Ausgabe, Forschungskuratorium Maschinenbau (2003). (FKM guideline, Mathematical proof of strength for machine components made of steel, cast iron and aluminium materials, 5th revised edition, Forschungskuratorium Maschinenbau).
English Translation of International Search Report issued in PCT/EP2020/083446, dated Feb. 25, 2021.

* cited by examiner

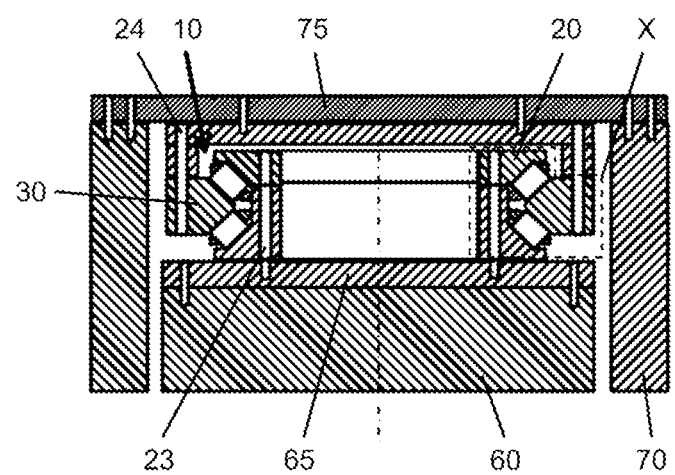
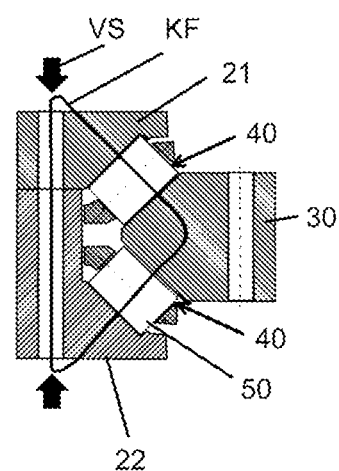
Fig. 5a        Fig. 5b
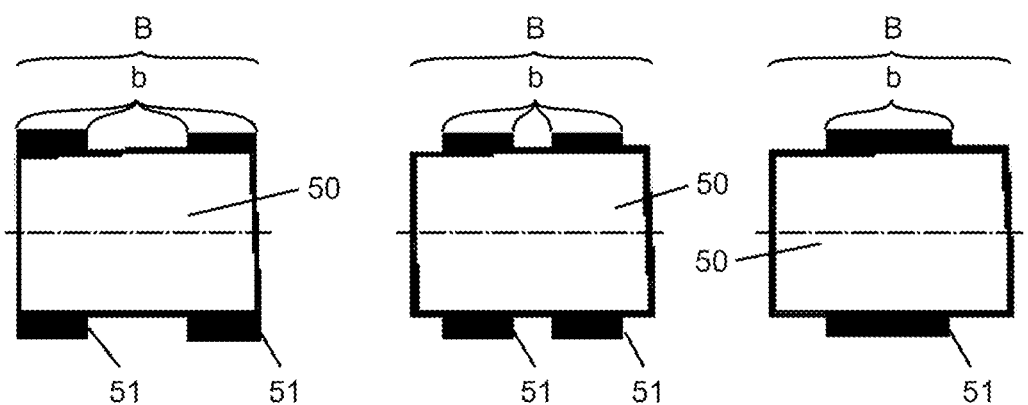
Fig. 6

METHOD FOR INCREASING THE LOAD-BEARING CAPACITY, AND ROLLING DEVICE FOR HARD ROLLING A SURFACE-HARDENED ROLLING-BEARING RACEWAY

CROSS REFERENCE TO RELATED APPLICATIONS

This application is a U.S. National Stage Entry of International Patent Application Serial Number PCT/EP2020/083446, filed Nov. 26, 2020, which claims priority to German Patent Application No. DE 10 2019 218 794.3, filed Dec. 3, 2019, the entire contents of both of which are incorporated herein by reference.

FIELD

The present disclosure generally relates to methods for increasing load capacity of surface-hardened rolling bearing raceways and to rolling apparatuses for hard rolling surface-hardened rolling bearing raceways.

BACKGROUND

DE 10 2016 114 895 A1 discloses a method for increasing the load capacity of a surface-hardened rolling bearing raceway. The profile of the residual stress is changed by rolling of the hardened peripheral region, and, in particular, the residual tensile stress maximum located below the hardened outer layer is reduced. During the rolling, a surface pressure of between 3500 and 5500 MPa is achieved. The roll used preferably comprises a rolling body, such that the rolling bearing ring is rolled directly with the correct raceway width. One disadvantage is that although the static load capacity of the rolling bearing raceway can be increased by the method, the dynamic continuous load capacity of the bearing decreases, resulting in a reduction in the average service life of the raceways and thus of the bearing.

Other rolling methods for treating hardened surfaces are known from DE 10 2015 201 644 A1 and EP 2 771 585 B1 EP 1 771 585 B1. The aim of these methods is to use deep rolling to form residual compressive stresses directly under the surface of metals, that is to say to work-harden the material and build up residual compressive stresses. Typically, in hardened steels, it is thus possible to generate compressive residual stresses of significant magnitude directly at the surface down to a depth range of several 100 μm. Cylindrical roller bodies with a diameter of 1 to 9 mm are used for the rolling. One disadvantage is that these methods make it possible to influence only the properties of a hardened outer layer itself, without increasing the static load capacity, which is limited by the residual stress profile below the hardened outer layer in the case of surface-hardened rolling bearing raceways.

Thus a need exists for a method and a rolling apparatus for increasing the static load capacity of a surface-hardened rolling bearing raceway, said method and rolling apparatus also improving the service life of the raceway.

BRIEF DESCRIPTION OF THE FIGURES

FIG. 5a is a schematic view illustrating a step of hard rolling rolling bearing raceways in a double-row tapered roller bearing with oversize rollers.

FIG. 5b shows a detail X of FIG. 5a.

FIG. 6 is a schematic view of a set of oversize rollers that can be inserted into a rolling bearing for a purpose of hard rolling rolling bearing raceways on overlapping paths.

DETAILED DESCRIPTION

Figure 1:
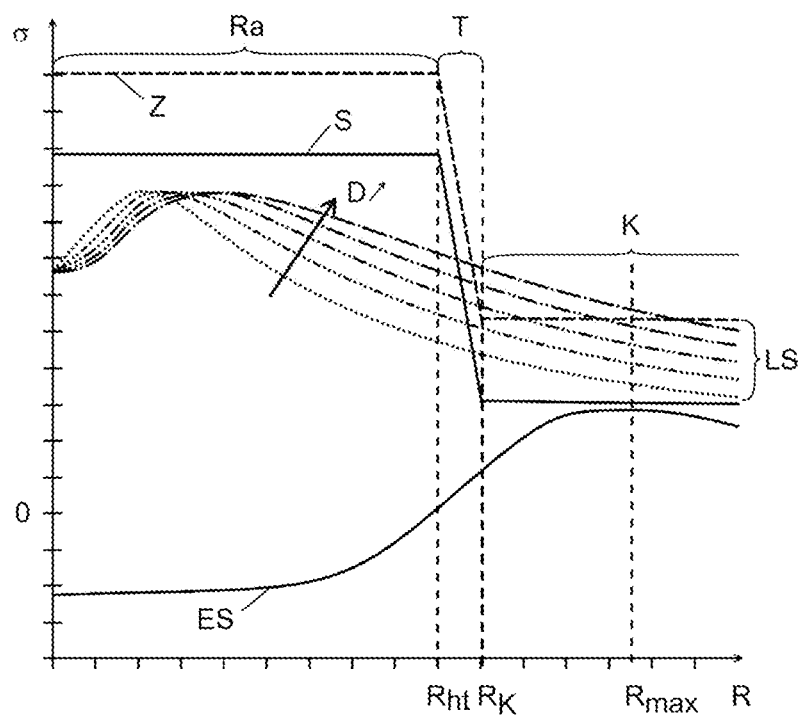
FIG. 1 is a schematic view of a profile of load stresses (without residual stresses) brought about in a surface-hardened rolling bearing ring element by rolls of different diameter in relation to tensile strength, yield strength, and residual stress profile in the rolling bearing ring element.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In this way, a method for increasing the load capacity of a surface-hardened rolling bearing raceway of a rolling bearing ring element is specified, comprising the following steps:

providing a rolling bearing ring element which has an unhardened core region and, at least in certain portions, an outer layer hardened to a surface hardening depth, a rolling bearing raceway being formed in the region of the hardened outer layer, hard rolling the rolling bearing raceway with at least one roll, the diameter of the roll being selected in the range of 8 to 25 times the surface hardening depth, a surface pressure prevailing in the rolling contact between the roll and the rolling bearing raceway during the hard rolling being set in the range between 2000 MPa and 3300 MPa, and the rolling bearing raceway being machined after the hard rolling.

Thus, according to the invention, surface pressures that are lower than those in the prior art are used during the hard rolling. This is based on the finding that although the plastification in the core region of the rolling bearing ring element brought about by the known surface pressures in the range from 3500 to 5500 MPa contributes particularly effectively to a reduction of the residual tensile stress maximum, specifically in such a way that higher surface pressures lead to a greater increase in the static load capacity, such plastification simultaneously leads, due to the microstructural changes introduced into the material, to a reduction in the dynamic deformation capacity of the material in the core region. If the bearing is subjected to continuous dynamic loading, microcracks will occur in the core region of the rolling bearing ring at an earlier stage and may grow into larger fatigue fractures and thus adversely affect the service life of the raceway. The surface pressures used according to the invention in the range between 2000 MPa and 3300 MPa (Hertzian stress) in combination with roll diameters that are large compared with the surface hardening depth achieve a depth effect during the hard rolling, in which the equivalent stress corresponding to the sum of load stresses and residual stresses does indeed exceed the yield strength of the rolling bearing ring element in the core region, but at the same time the resulting plastic deformations in the core region are minimized. A particularly good compromise between careful material processing and, at the same time, effective reduction of residual stresses is achieved for surface pressures in the range from 2300 MPa to 2800 MPa.

It was also found that the hard-rolling step gives rise to changes in surface structure in the rolling bearing raceway, which lead to stress peaks when rolling bodies roll over them and can thus damage the raceway and rolling bodies. According to the invention, it is therefore provided that, subsequent to the hard-rolling step, changes in surface structure are removed by machining in order to further increase the service life of the raceway.

In a preferred embodiment, the surface pressure in the rolling contact is selected in such a way that load stresses brought about in the unhardened core region are at most 0.9 to 2 times, preferably 1.2 to 1.5 times, the yield strength of the unhardened core region. The unhardened core region begins at a surface distance of approximately 1.1 times the surface hardening depth. In the context of the invention, load stress should be understood to mean the equivalent stress which corresponds to the real, multi-axial stress state introduced into the rolling bearing element by the hard rolling and enables a comparison with the (one-dimensional) material property yield strength. The load stress is preferably calculated using the distortion energy hypothesis. In order to effectively reduce the residual tensile stress maximum in the core region, it is necessary for the equivalent stress of the sum of load stresses and residual stresses to exceed the yield strength of the core material, such that the residual stresses can be reduced by rearrangements. If the load stresses in the unhardened core region do not exceed 0.9 to 2 times the yield strength of the material of the rolling bearing ring element, the plastic deformations of the core material are minimized as much as possible. In particular, micro-cracking, as could occur as a result of the tensile strength of the material being locally exceeded, is avoided. Due to the careful processing of the rolling bearing raceway, the plastic deformation capacity of the rolling bearing raceway also remains largely unchanged.

Particularly preferably, the surface pressure in the rolling contact is selected in such a way that the hard rolling at most gives rise to plastic strain of up to 5% in the core region. By reducing the plastification to 5% strain, the core material is prevented from flowing over further sections. As a result, the original microstructure of the material is retained and the residual stresses are reduced by local strain/compression of the core material.

The rolling bearing ring elements are preferably formed from a rolling bearing steel, such as 42CrMo4.

During the hard rolling, the rolling bearing raceway is preferably overrolled between 1 and 100 times, particularly preferably between 2 and 10 times. The greatest reduction of the residual tensile stress maximum occurs already during the first overrolling. However, specifically when using the lower surface pressures compared with the prior art, it has been found that subsequent overrolling can also contribute significantly to the reduction of the residual tensile stress maximum. More than 10 overrollings would also still have a measurable effect, but they are often no longer worthwhile from an economic point of view.

In order to reduce the forces to be absorbed by a rolling apparatus used for the hard rolling at the specified surface pressures, it is advantageous if the rolling contact has a width of at most ⅔ of the width of the rolling bearing raceway and the rolling bearing raceway is hard-rolled in multiple overlapping paths.

In a preferred embodiment, the roll has a lateral surface which is convexly curved in longitudinal section at least in peripheral regions of the rolling contact. Due to the curvature of the roll in the peripheral regions, excessive stresses at the peripheries of the rolling contact in the rolling bearing raceway are reduced. This protects the surface of the rolling bearing raceway and reduces the changes in surface structure that occur. Consequently, the outlay for the subsequent machining is reduced. The convexly curved configuration is particularly preferred for rolls that are narrower than the rolling bearing raceway, so that wear in the rolling bearing raceway is avoided.

The rolling bearing ring elements are preferably manufactured with an allowance at least in the region of the rolling bearing raceways. The allowance preferably corresponds to the maximum expected changes in surface structure. In this way, the outlay for the subsequent machining can be reduced.

In a preferred embodiment, the rolling bearing rings of a roller bearing are provided as rolling bearing ring elements, the roller bearing is assembled for hard rolling with the introduction of at least one roller row between the rolling bearing rings, the roller row comprising at least one oversize roller with a radial oversize as the roll, and the surface pressure is introduced into the roller bearing by an axially acting load. This has the advantage that no separate rolling apparatus is required for the hard rolling. Hard rolling is performed by rotating the rolling bearing rings of a loaded bearing provided with at least one oversize roller. To this end, it is for example possible for a lower rolling bearing ring to be fixed and an upper rolling bearing ring to be correspondingly loaded, for example by means of a hydraulic cylinder or a weight, and rotated in relation to the lower rolling bearing ring. After a single revolution or multiple revolutions of the upper rolling bearing ring, the rolling bearing raceways have been hard-rolled.

If the roller bearing contains at least two roller rows and at least one of the rolling bearing rings has at least two partial rings which can be braced axially against one another for enclosing the roller rows between the rolling bearing rings in a positively locking manner, the axially acting load may also be applied by axial bracing of the partial rings against one another. As a result, there is also no longer any need for a device for the external application of force onto the bearing. It is for example possible for the partial rings to be braced axially against one another by screwing.

In a preferred embodiment of the method according to the invention, at least three oversize rollers are inserted as rolls into the roller bearing so as to be distributed over the circumference of a rolling bearing raceway. As a result, the load transfer between the rolling bearing rings can be homogenized and the deformation of the rings during the hard rolling can be reduced. Particularly preferably, the oversize rollers have the radial oversize on different, overlapping partial regions of the raceway width.

In order to improve the dimensional accuracy of the rolling bearing rings during the hard rolling, it is also preferred that the at least one roller row is fully occupied with rollers.

The method according to the invention is preferably employed in the production of large rolling bearings having a diameter of more than 1000 mm. The method is particularly suitable for the production of rotor bearings for wind turbines. The invention therefore also relates to a rotor bearing for a wind turbine, comprising at least one row of tapered or cylinder rollers, the rolling bearing raceways of the rotor bearing being produced by carrying out the method described above.

In terms of apparatus, the object is achieved by means of a rolling apparatus for hard rolling a surface-hardened rolling bearing raceway of a rolling bearing ring element, comprising a support apparatus with at least one supporting roll for supporting the rolling bearing ring element and a yoke which is held by means of at least two tension rods which are articulated on the support apparatus. In this case, the yoke forms, together with the tension rods and the support apparatus, a closed frame through which the rolling bearing ring element can be guided during the hard rolling. The rolling apparatus also comprises a roll stand which is hydraulically supported on the yoke, which is mounted so as to be displaceable in a longitudinal direction of the yoke by means of a positioning device and in which at least one roll provided for processing the rolling bearing raceway is mounted.

The closed frame allows a surface pressure of the roll to build up in relation to a rolling bearing raceway of the rolling bearing element in a simple and controlled manner. The roll can in this case be positioned in relation to the rolling bearing raceway by displacing the roll stand. For further positioning, one or more of the tension rods may be of length-adjustable form. In particular when using rolls with a smaller width than the rolling bearing raceway, provision may be made for the roll stand to be displaced during the hard rolling, but preferably without load, along the yoke when changing paths. As a result, the entire rolling bearing raceway can be hard-rolled successively in overlapping paths. The roll stand can preferably be displaced in the longitudinal direction of the yoke by means of a screw drive.

For the hard rolling of rolling bearing raceways of closed rolling bearing rings as rolling bearing ring elements, it is advantageous if the closed frame is configured to be openable for receiving and removing the rolling bearing ring element.

In a preferred embodiment of the rolling apparatus, the roll stand is supported on the yoke by way of at least one pressurizable hydraulic cylinder.

Furthermore, the roll is preferably in the form of a primary roll which is mounted by way of guide bearings which are arranged so as to be displaceable in the load direction in the roll stand, and at least one secondary roll with a larger diameter than the primary roll is mounted in the roll stand and circumferentially supports the primary roll for load dissipation. The mounting of the primary roll by means of displaceable guide bearings has the effect that the smaller primary roll is kept in position without its bearing arrangement having to be designed to absorb the entire rolling load. The rolling load is dissipated via the larger-sized bearings of the at least one secondary roll.

Further advantageous embodiments can be gathered from the following description and the dependent claims.

The invention is explained in more detail below with reference to the exemplary embodiments illustrated in the accompanying figures.

In FIG. 1, material properties of a surface-hardened rolling bearing ring element and the load stress profile brought about by rolls or rolling bodies of different diameter D are shown.

The distance R from the surface of the rolling bearing ring element is plotted on the abscissa, and the stress σ (equivalent stress, residual stress, permissible stresses such as tensile strength and yield strength) is plotted on the ordinate. The material of the rolling bearing ring, preferably steel, has three qualitatively differing regions: a hardened outer layer Ra which extends from the surface down to a surface hardening depth Rht and which is distinguished by an increased tensile strength Z and yield strength S, an unhardened core region K which has a lower tensile strength Z and yield strength S than the outer layer Ra beginning at a surface distance RK, and a transition region T which lies between these regions and in which tensile strength Z and yield strength S fall to the values of the core region K. The transition region T usually has a depth of approx. 0.1 Ra, such that usually RK=approx. 1.1×Rht.

Due to the surface hardening of the rolling bearing ring element, residual stresses ES have been introduced into the material, the qualitative profile of which is also illustrated in FIG. 1. There are residual compressive stresses ($\sigma\square<0$) in the hardened outer layer Ra. Due to the residual compressive stresses in the outer layer Ra, the strength of the rolling bearing ring element at the raceway surface is increased. In the transition region T, the residual compressive stresses turn into residual tensile stresses ($\sigma\square>0$), which reach their maximum in the core region K at a surface distance Rmax.

In the case of rolling bearing raceways of surface-hardened rolling bearing rings, permanent changes in shape occur when the total equivalent stresses introduced into the material from load stresses introduced by rolls or rolling bodies and residual stresses present in the material exceed the yield strength S of the material. While the yield strength S in the hardened outer layer Ra is increased and the residual compressive stresses ES in the outer layer Ra counteract the load stresses LS, the residual tensile stresses ES and load stresses LS present in the core region K with a lower yield strength S add up to a larger total equivalent stress.

FIG. 1 illustrates various load stress curves LS for various diameters D of rolls or rolling bodies. The line made up of single dots and dashes corresponds to the largest diameter, and the line made up of continuous dots corresponds to the smallest. As can be seen from FIG. 1, the load stress curve has a maximum in the region of the hardened outer layer Ra and then falls toward the core region K. The maximum load stress remains essentially the same for different diameters D, but the maximum shifts to larger surface distances R. As a result, the load stresses brought about in the core region K increase. In the case of an unchanged surface hardening depth Ra and unchanged surface pressures P in the rolling contact, an increase in the rolling body diameter D can therefore lead to the yield strength S being exceeded in the unhardened core region K.

In many technical areas of application of large rolling bearings, increases in efficiency can be achieved in the course of technical progress by scaling of the plants. For this reason, there is for example also a demand for rolling bearings with surface-hardened raceways in ever larger dimensions for the bearing arrangement of main rotors of wind turbines. In this case, the diameters of the rolling bodies (essentially tapered and cylinder rollers) used in the bearings also increase. The use of larger rolling bodies makes it possible for higher forces to be supported via the bearing with unchanged surface pressures in the rolling contact.

The design of the rolling bearings requires the consideration of permanent operating loads and extreme loads. These must not lead to bearing damage. The permanently permissible operating loads are limited by the load stresses occurring at the depth RK=approx. $1.1 \times Rht$ in relation to the yield strength S.

By contrast, the permissible extreme loads are determined inter alia from the permanent deformation of the raceway surface brought about by the extreme load. In practice, pivot bearings are usually designed using the Zwirlein method (Zwirlein et al. (1983), Case Depth for Induction Hardened Slewing Bearing Rings, SAE Technical Paper Series 831371). In order to achieve the static load capacity specified therein, exceedance of the yield strength S in the core region K must be avoided. To this end, it is customary to increase the surface hardening depth Ra with increasing diameter D of the rolling body, as a result of which the core region K is exposed to lower load stresses. In practice, a 10% rule for the ratio of surface hardening depth Ra to rolling body diameter D has become established.

In a deviation therefrom, the static load capacity of main rotor bearings for wind turbines should be assessed on the basis of standard ISO 76. This standard contains a more stringent requirement for the permissible plastic deformation of the rolling body raceways in relation to the rolling body diameter, which reduces the static load capacity during the transition from pivot bearings to rotor bearings.

This more stringent requirement pushes the known procedure of increasing the surface hardening depth Rht to its limits. The surface hardening depth Rht that can be achieved by induction hardening is limited by the material to be hardened, its heat treatment state and the plant engineering/method used. In the case of inductively full-surface-hardened raceways, the "10% rule" is already limited for large rolling body diameters D of 65-120 mm due to the plant and method.

Alternatively, it is conceivable to increase the core strength by a different selection of the grade of steel used as base material. However, due to the increased need for alloying elements and the increased machining costs, this would also result in significant cost increases.

To increase the static load capacity of surface-hardened rolling bearing raceways, the method according to the invention therefore follows a different approach. The rolling bearing ring elements are usually surface-hardened in an inductive manner. However, an application of the method according to the invention to rolling bearing ring elements that have been surface-hardened in some other way, for example case-hardened, is also covered by the invention. As already explained with reference to FIG. 1, the permissible deformations of the rolling bearing raceway that limit the static load capacity are promoted by the residual tensile stresses present in the core region K, since they increase the total equivalent stress LES from load and residual stresses in the core region K. The method according to the invention therefore aims to reduce the residual tensile stresses in the core region K, as a result of which the same load stresses LS lead to smaller deformations of the rolling bearing raceway 2. The reduction of the residual tensile stress maximum and the associated hardening effect of the rolling bearing raceway in relation to static loads can be achieved by a rolling operation, which can therefore be referred to as hard rolling.

Figure 2:
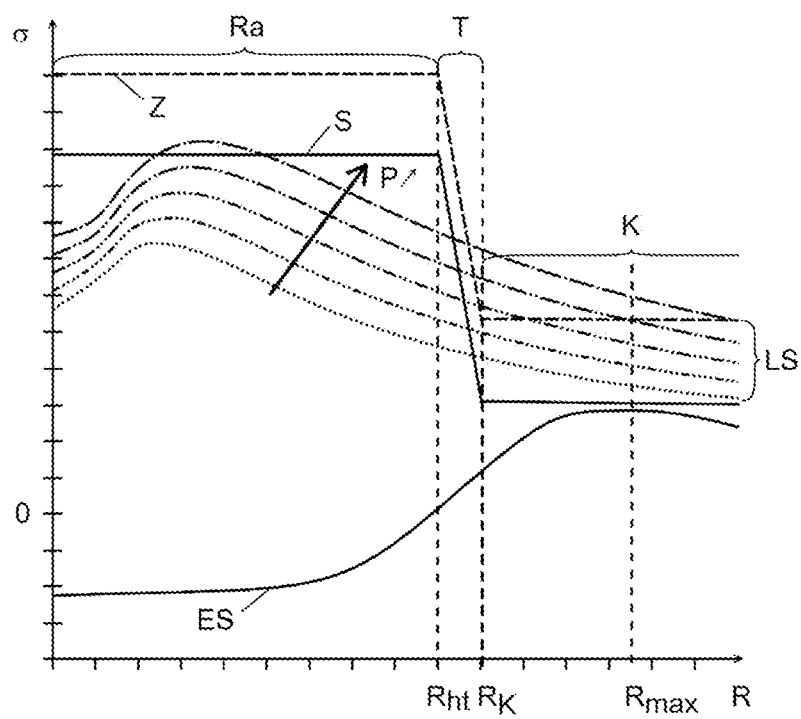
FIG. 2 is a schematic view of a profile of load stresses brought about in a surface-hardened rolling bearing ring element by rolls using different surface pressures in relation to tensile strength, yield strength, and residual stress profile in the rolling bearing ring element.

The load stresses LS introduced into the core region K are crucial for the reduction of the residual tensile stress maximum. These load stresses LS can be set substantially by the parameters roll diameter D (see FIG. 1) and surface pressure P (see FIG. 2). FIG. 2 illustrates the load stresses resulting from various surface pressures with the same roll diameter. The line made up of single dots and dashes corresponds to the highest surface pressure.

Figure 3:
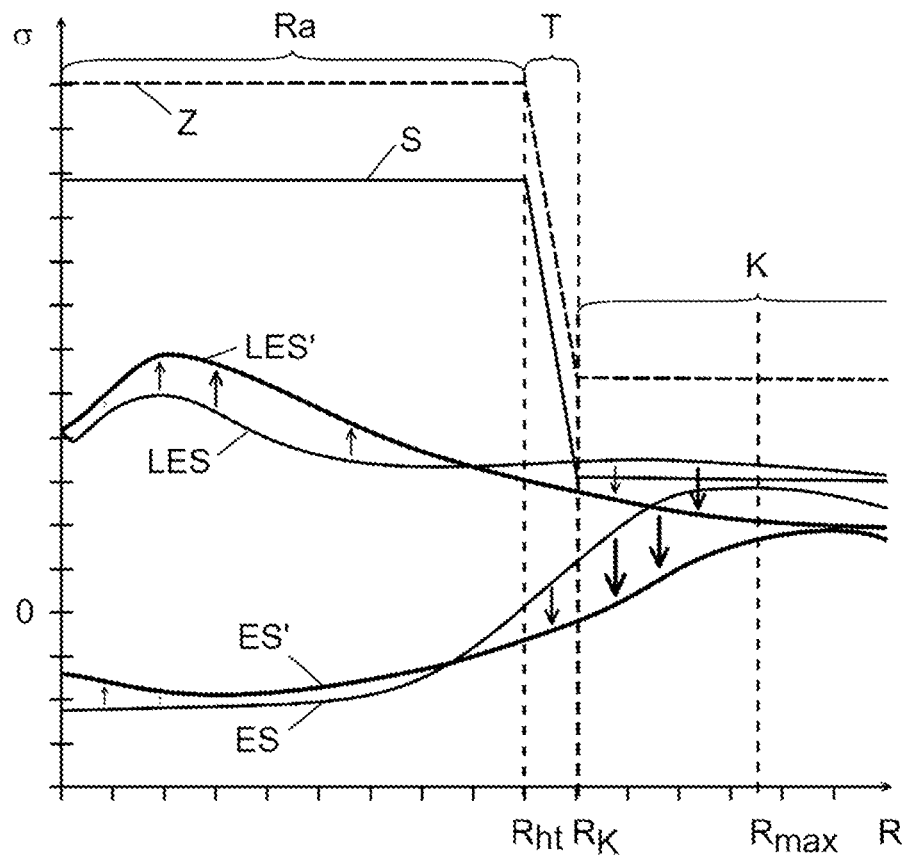
FIG. 3 is a schematic view of a total equivalent stress in a rolling bearing ring element brought about during the hard rolling by load and residual stress, and also a residual stress profile before and after the hard rolling.

FIG. 3 shows the reduction of the residual tensile stress maximum by the method according to the invention and the resulting greater static load capacity of the rolling bearing raceway. The curve ES shows the profile of the residual stresses before the hard rolling, and the curve ES' shows the residual stresses after the hard rolling. While the residual compressive stresses in the hardened outer layer Ra are slightly reduced, the residual tensile stresses in the core region K decrease significantly. The combined total equivalent stress LES from load and residual stresses exceeds the yield strength S in the core region K during the hard rolling operation and, as a result, leads to the reduction of the residual tensile stresses by rearrangements. Renewed loading of the rolling bearing raceway by the same load stress after the hard rolling results in a lower combined total equivalent stress LES' in the core region K, the entire profile of said total equivalent stress remaining below the yield strength S. The static load capacity of the rolling bearing raceway is thus increased by the hard rolling operation.

Figures 4A, 4B, 4C:
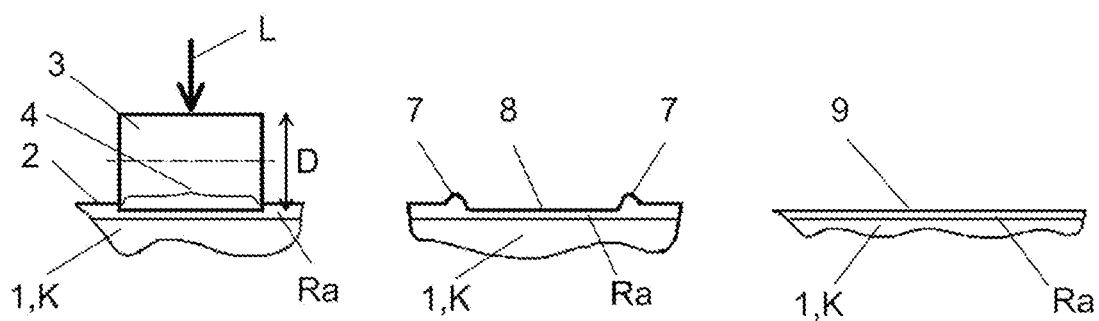
FIG. 4a is a schematic, cross-sectional view of an example rolling bearing ring element, illustrating a first step in a sequence of a method of the present disclosure.
FIG. 4b is a schematic, cross-sectional view of the example rolling bearing ring element shown in FIG. 4a, illustrating a second step in a sequence of a method of the present disclosure.
FIG. 4c is a schematic, cross-sectional view of the example rolling bearing ring element shown in FIGS. 4a and 4b, illustrating a third step in a sequence of a method of the present disclosure.

FIGS. 4a to 4c schematically illustrate the performance of the method according to the invention for increasing the load capacity of a surface-hardened rolling bearing raceway 2 of a rolling bearing ring element 1. In FIG. 4a, a rolling bearing ring element 1 is firstly provided which has an unhardened core region K and, at least in certain portions, an outer layer Ra hardened to a surface hardening depth, a rolling bearing raceway 2 being formed in the region of the hardened outer layer Ra. Subsequently, the rolling bearing raceway 2 is hard-rolled with a roll 3, the diameter D of which is in the range of 8 to 25 times the surface hardening depth. In the rolling contact 4 between the roll 3 and the rolling bearing raceway 2, a surface pressure prevailing during the hard rolling is set in the range between 2000 MPa and 3300 MPa. To this end, the roll 3 is preferably loaded in a load direction L which is substantially perpendicular to the rolling bearing raceway.

Due to the surface pressure exerted on the raceway with a roll of sufficiently large diameter during the hard rolling, the plastic deformation in the base material begins directly at the boundary to the hardened outer layer, where the material is, in addition to the load stresses, stressed by the originally effective residual stresses above the yield strength S. After the load has been removed from the raceway surface, a measurable shape deviation (indent/running track) remains in the rolled rolling bearing raceway 8 (see FIG. 4b).

During the hard rolling with the specified parameters, changes in surface structure 7 occur which amount to a few ten-thousandths of the rolling body diameter D. These changes in surface structure are removed by machining of the rolling bearing raceway 2 after the hard rolling, such that a planar, machined rolling bearing raceway 9 is produced (see FIG. 4c). The raceway treated in this way can withstand renewed stresses of the same type and magnitude with much less deviation in shape and thus has an increased static load capacity. Machining may be performed with a defined or undefined cutting edge.

In order to achieve the desired effect of reducing the residual tensile stresses in the core region without negatively influencing the dynamic continuous load capacity of the rolling bearing raceway, the claimed combination of surface pressures P and roll diameters D is essential for the teaching according to the invention.

Selecting the roll diameter D in the range of 8 to 25 times the surface hardening depth Rht ensures that the load stresses LS act at the required material depth. In contrast to other known methods for deep rolling hardened bearing rings, no further build-up of residual compressive stresses or large-volume material consolidation (formation of dislocations) is sought by the hard rolling according to the invention. On the contrary, the method according to the invention reduces high residual stress peaks, such as those that occur at inclusions, for example, such that there are lower stress fluctuations in these regions during operation of the bearing and thus higher dynamic load capacities/service lives. Thermal relaxation can preferably be carried out, for example at 160-180° C., before or after the deep rolling in order to further increase the dimensional stability and load capacity. The rolling roller used preferably has approximately the same diameter D as the rolling body used at a later stage in the bearing.

What can simultaneously be achieved when hard rolling with the parameter ranges for roll diameter D and surface pressure P provided as claimed in claim 1 is that
- the material below the hardened outer layer Ra plastifies in the core region K and the residual tensile stresses in this region are removed,
- the material in the hardened outer layer Ra (above the surface hardening depth Rht) is substantially elastically stressed in the region without geometrical disturbances (e.g. inclusions) and at most experiences a low degree of plastification, such that, in contrast to known deep rolling methods, residual compressive stresses from the hardening and quenching heat treatment remain unchanged or are reduced, and
- the material in the hardened outer layer Ra (above the surface hardening depth Rht) is plastically stressed in the region with geometrical disturbances (e.g. inclusions).

The residual stress rearrangements generated by the method according to the invention—in a large-volume manner in the core region K and also locally limited to discontinuities and inclusions in the hardened outer layer—lead to an increased static and dynamic load capacity and dimensional stability of the treated bearings.

According to an advantageous refinement of the invention, the surface pressures used during the hard rolling should not exceed the maximum static load in the core region K that is expected during operation of the bearing. Although a larger surface pressure essentially leads to a more rapid and more effective reduction of the residual tensile stress maximum, it at the same time reduces the deformation capacity and thus the expected service life of the rolling bearing ring under continuous loading.

Based on this consideration, the surface pressure in the rolling contact 4 is preferably selected in such a way that load stresses LS brought about in the unhardened core region K are at most 0.9 to 2 times, preferably 1.2 to 1.5 times, the yield strength S of the unhardened core region K. As already mentioned above, the dynamic continuous load capacity of a rolling bearing is given, for example, by an equivalent stress of approx. 0.6 times the yield strength S at the beginning RK=approx. 1.1×Rht of the core region K (that is to say, for example, according to Zwirlein et al. (1983), SAE Technical Paper Series 831371). When designing rolling bearings, customary factors between dynamic continuous load capacity and extreme static load are in the range from 1.5 to 3.3, in particular between 2 and 2.5, which results in the specified ranges for the load stress LS during the hard rolling.

In addition, selecting the roll diameter D and the surface pressure in dependence on the existing surface hardening depth Rht or the residual stresses ES and the associated material parameters (tensile strength Z and yield strength S of the outer layer material and of the core material) preferably satisfies the following criteria:

Criteria relating to the material in the core region K:
a) Preferably, the surface pressure P in the rolling contact 4 is selected in such a way that the hard rolling at most gives rise to plastic strain of up to 5% in the core region K. The plastic deformation in the core region K due to the loading from the total equivalent stress LES from resulting load stresses LS and effective original residual stresses ES can be determined in advance, for example in an FEM simulation, taking into account yield strength S and/or tensile strength Z.
b) Preferably, the loadings from the total equivalent stress LES from load stresses LS and effective original residual stresses ES in the core region K are, at least in certain portions, in particular in the portion from the beginning of the core region RK (=approx. 1.1×Rht) as far as the surface distance of maximum residual tensile stresses Rmax, above the yield strength S of the core region K.

Criteria relating to the material in the hardened outer layer Ra:
c) Preferably, the surface pressure P in the rolling contact 4 is selected in such a way that the hard rolling at most gives rise to plastic strain of up to 2% in the outer layer Ra. The plastic deformation in the peripheral region due to the loading from the total equivalent stress LES from resulting load stresses LS and effective original residual stresses ES can be determined in advance in a computer simulation, for example in an FEM simulation, taking into account the aforementioned material parameters.
d) Preferably, the loading from the total equivalent stress LES from load stresses LS and effective original residual stresses ES at inclusions and discontinuities in the hardened outer layer Ra is above the yield strength.

This has the advantage that the maximum rolling stress also occurs in the hardened outer layer beforehand. This reduces stress peaks at the peripheries of any inclusions that may be present. During operation, these counteract crack growth at the peripheries of the inclusions.

Particularly preferably, a computer simulation is used as a basis to select the parameters surface pressure P and rolling body diameter D so as to match the material properties of the rolling bearing ring element. This makes it possible to optimize the number of the aforementioned criteria that can be satisfied.

According to the invention, the number of overrollings during the hard rolling should be between 1 and 100. 2 to 10 overrollings are preferably carried out.

In principle, it is also conceivable to carry out the hard rolling such that the roll presses onto the raceway surface in small, spaced-apart steps, instead of hard rolling such that a roll rolls on the raceway surface. Such "hard pressing" should be understood as being covered by the term hard rolling.

If there is sufficient rolling force, hard rolling can be carried out simultaneously over the entire raceway width B. Alternatively, however, the rolling contact 4 has a width b of, for example, at most ⅔ of the width B of the rolling bearing raceway 2 and the rolling bearing raceway 2 is hard-rolled in multiple overlapping paths. In this case, only a relatively low rolling force has to be provided. A minimum width b of the rolling contact 4 of 10% of the rolling body diameter D is advantageous.

In order to reduce stress peaks at the peripheries of the rolling contact, the roll 3 preferably has a lateral surface 5 which is convexly curved in longitudinal section at least in peripheral regions 6 of the rolling contact 4.

FIGS. 5a and b schematically show the step of hard rolling rolling bearing raceways in a double-row tapered roller bearing with oversize rollers.

In this case, the rolling bearing rings 20, 30 of a roller bearing 10 are provided as rolling bearing ring elements, the roller bearing 10 is assembled for hard rolling with the introduction of two roller rows 40 between the rolling bearing rings 20, 30, the roller rows 40 comprising at least one oversize roller 50 with a radial oversize 51 as a roll, and the surface pressure is introduced into the roller bearing 10 by an axially acting load.

The roller bearing 10 shown in FIG. 5a is a double-row tapered roller bearing which contains two roller rows 40, at least one of the rolling bearing rings 20, 30 has two partial rings 21, 22 which can be braced axially against one another for enclosing the roller rows 40 between the rolling bearing rings 20, 30 in a positively locking manner, and the axially acting load is applied by axial bracing of the partial rings 21, 22 against one another. To this end, the two partial rings 21, 22 are screwed to a connection structure by way of common fastening screws 23. The connection structure is formed here by way of example from a first plate 65 arranged on a turntable 60.

The magnitude of the rolling force results from the oversize of the oversize rollers 50, the prestress VS applied by the fastening screws 23 and the elastic properties of the structure. The prestress VS and the oversize of the rolling rollers represent the crucial, settable variable for the resulting rolling force.

The other rolling bearing ring 30 is fixed to a stationary connection structure by way of fastening screws 24. In FIG. 5a, the stationary connection structure is formed from a stationary bracket 70 and a second plate 75. The rolling can be effected by driving the turntable 60. The fixing of the stationary ring 30 in relation to the driven turntable 60 has the effect that one of the rolling bearing rings 20, 30 is set in rotation, with the raceways 2 of the rolling bearing rings 20, 30 being overrolled by the oversize rollers 50. Hard rolling of the entire rolling bearing raceway 2 is thus effected over one or more revolutions.

FIG. 5b shows the detail X of FIG. 5a. Due to the screwing, a prestress VS is introduced into the bearing and impresses the required rolling force on the raceway surface at the oversize rollers. The resulting force flow KF is illustrated by way of example in FIG. 5b.

The rolling bearing rings 20, 30 are preferably manufactured with an allowance at least in the region of the rolling bearing raceway.

The roller bearing 10 is preferably equipped with the full number of rollers in the roller rows 40. This has the advantage that the roller bearing 10 remains dimensionally accurate even during the rolling operation, that is to say displacement of the rolling bearing rings 20, 30 relative to one another is limited and the shape deviation of each rolling bearing ring 20, 30 is minimized. This ensures that the rolling bearing raceway is plastified uniformly over the circumference and width of the raceway. Rollers in the circumferential vicinity of an oversize roller 50 have load removed due to the radial oversize of the oversize roller 50 and accordingly contribute less or nothing at all to the dimensional accuracy and can also be omitted. The number of oversize rollers 50 determines the necessary drive torque, which is necessary for turning the turntable 60 and thus for hard rolling.

The length of all rollers (including the oversize rollers 50) preferably corresponds to the raceway width B (or the width of the region to be hard-rolled). The profiling (contour) and the oversize of the rolling rollers are to be selected in such a way that the desired surface pressures occur in all regions of the raceway during the rolling and high edge pressures are avoided.

At least one, preferably at least three oversize rollers 50 are inserted as rolls into the roller bearing 10 so as to be distributed over the circumference of a rolling bearing raceway. For the uniform distribution of the rolling force, the oversize rollers are preferably distributed in a rotationally symmetrical manner in the respective raceway.

The preferably at least three oversize rollers 50 can be of the same form. However, it is preferred if the oversize rollers 50 have the radial oversize 51 on different, overlapping partial regions 52, 53, 54 of the raceway width B (see FIG. 6). As a result, the rolling forces required to achieve the required surface pressures P and depth loads can be reduced. All oversize rollers 50 in a roller row 40 are matched to one another in such a way that the entire raceway width B of each roller row 40 is overrolled on a track-by-track basis and there is an overlap between the regions with local oversize.

For example, the oversize rollers may have an oversize of approx. 1-2% of the rolling body diameter. After the hard rolling, the roller bearing 10 has to be dismantled and the raceway has to be finished by machining.

Computer analysis of the contact pressure, taking into account the profiling of the oversize rollers (e.g. logarithmic profiling), identifies high edge pressures or asymmetries. These can be reduced or avoided, for example, through changes to the roll profile, the stiffnesses of the connection structure or the profiling of the raceway.

Symmetrical implementation of the stiffnesses associated with the bearing is advantageous for the design. If this cannot be complied with, it is still possible to achieve the same resultant pressure on the rolling body raceways by selection of different radial oversizes in the two roller rows 40 of the roller bearing 10.

Figure 7:
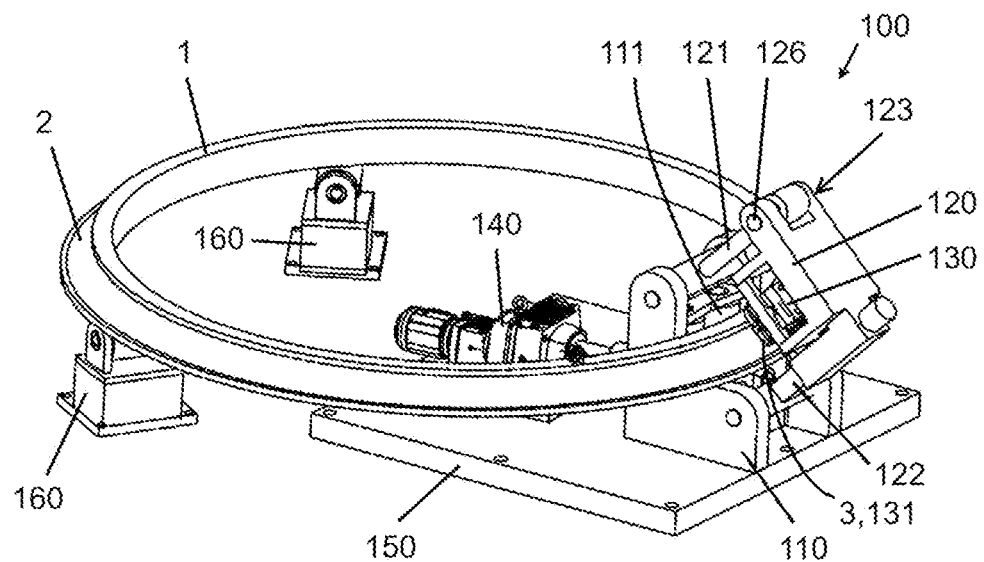
FIG. 7 is a schematic view of an exemplary embodiment of a rolling apparatus during processing of an outer raceway of a rolling bearing ring element.
Figure 8:
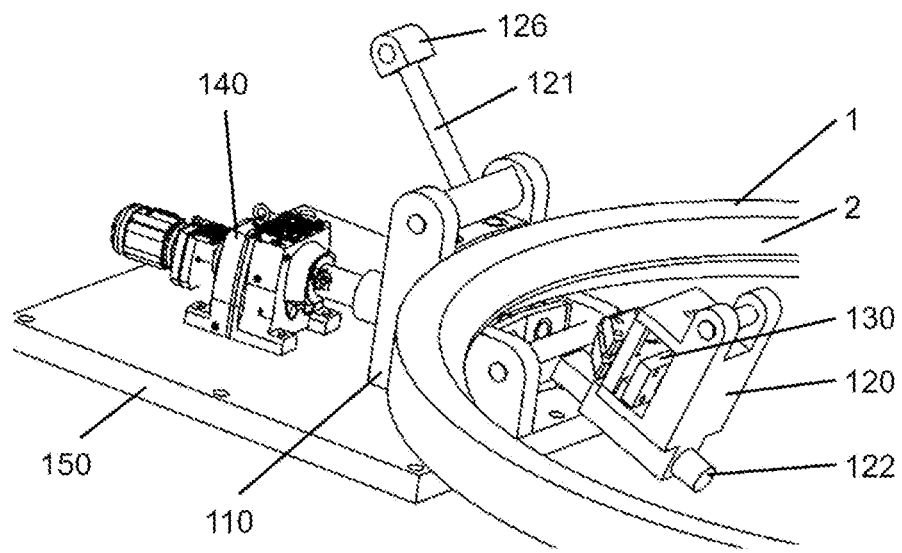
FIG. 8 is a schematic view of the rolling apparatus of FIG. 7 during processing of an inner raceway of a rolling bearing ring element with an open frame.

In FIGS. 7 to 9, an exemplary embodiment of a rolling apparatus 100 according to the invention is illustrated.

The rolling apparatus 100 for hard rolling a surface-hardened rolling bearing raceway 2 of a rolling bearing ring element 1 comprises a support apparatus 110 with supporting rolls 111, 112 for supporting the rolling bearing ring element 1, a yoke 120 which is held by means of at least two tension rods 121, 122 which are articulated on the support apparatus 110, and a roll stand 130 which is hydraulically supported on the yoke 120 and which is mounted so as to be displaceable in the longitudinal direction of the yoke 120 by means of a positioning device 124. In this case, the yoke 120 forms, together with the tension rods 121, 122 and the support apparatus 110, a closed frame 130 through which the rolling bearing ring element 1 can be guided during the hard rolling. At least one roll 3 provided for processing the rolling bearing raceway 2 is mounted in the roll stand 130.

The tension rods are articulatedly mounted in order to keep the rolling bearing ring element 1 and the roll 3 free of forces parallel to the raceway surface. The two tension rods 121, 122 carry the yoke 120 with the positioning device 124 (for example a screw drive) for the roll stand 130. The positioning device 124 preferably additionally has a guide for mounting the roll stand 130.

The positioning device 124 allows the roll stand 130 to be positioned above the rolling bearing raceway 2. In the exemplary embodiment illustrated, the positioning device 124 consists of a parallel guide, which covers at least the raceway width B of the rolling bearing ring element 1, and a driven spindle or rack with which the roll stand 130 can be displaced in a transverse direction parallel to the raceway surface.

The roll stand 130 is preferably supported on the yoke 120 by way of at least one pressurizable hydraulic cylinder 125, which is used to apply the required rolling force. By way of the hydraulic cylinder 125, the roll stand 130 may also be displaceable by a few millimeters perpendicularly with respect to the rolling bearing raceway 2 to be processed. The hydraulic cylinder 125 arranged between the yoke 120 and the roll stand 130 braces the roll stand 130 between the yoke 120 and the rolling bearing raceway 2 in the loaded state.

During the hard rolling, the rolling bearing ring element 1 is preferably supported, on the one hand, in the rolling apparatus 100 and, on the other hand, on support brackets 160 having carrier rollers distributed over the extent of the rolling bearing ring element 1.

Preferably, the tension rods 121, 122 are length-adjustable, for example via a thread. This makes it possible to simplify hard rolling of different ring cross sections with different raceway support angles.

Provision is preferably made for the closed frame 130 to be configured to be openable for receiving and removing the rolling bearing ring element 1. To this end, it is for example possible to provide a bolt connection 126 on at least one of the two tension rods 121, 122. The closed frame 123 can be opened and pivoted into a loading position by unplugging of a bolt or by way of another easily releasable connection. The rolling bearing ring element 1 to be rolled can then be placed on.

As illustrated in FIG. 7, the rolling apparatus 100 further preferably comprises a drive 140 for driving the supporting rolls 111, 112. As a result, the force flow of the rolling force is advantageously utilized in order to exert a propulsive force on the rolling bearing ring element 1. The drive 140 and the rolling apparatus 100 are preferably arranged on a common base plate 150.

In FIG. 8, the rolling apparatus 100 from FIG. 7 is shown in the open loading position. In this example, the bolt connection 126 for opening the closed frame 123 is configured between the tension rod 121 and the yoke 120. However, a bolt connection at another point on the frame 123 is also conceivable, for example between the support apparatus 110 and the tension rod 121.

FIG. 8 also shows that the rolling apparatus 100 of FIG. 7 is suitable both for hard rolling an inner and an outer rolling body raceway of the same roller bearing 10.

Figure 9A:
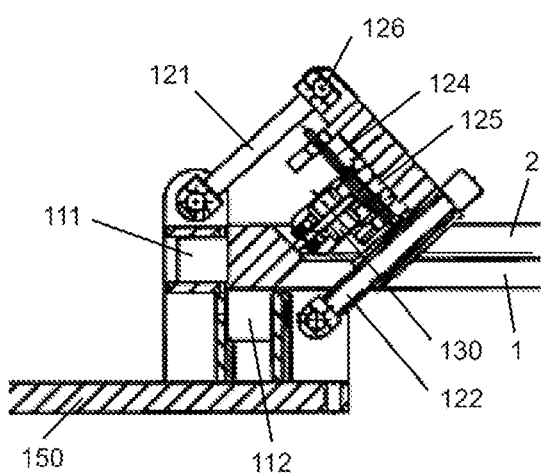
FIG. 9a is a schematic, cross-sectional view of the example rolling apparatus of FIG. 8.

FIG. 9*a* shows the rolling apparatus 100 of FIG. 8 in cross section. As can be seen from FIG. 9*a*, for the hard rolling of rolling bearing raceways 2 which run inclined with respect to the axis of the roller bearing, the support apparatus 110 is preferably configured with an L-shaped bearing surface, in which at least one, preferably two, radial supporting rolls 111 and at least one, preferably two, axial supporting rolls 112 are arranged in each case. For the hard rolling of radial or axial rolling bearing raceways, the bearing surface of the support apparatus can also be configured to be flat with lateral guides for the rolling bearing ring element 1.

Figure 9B:
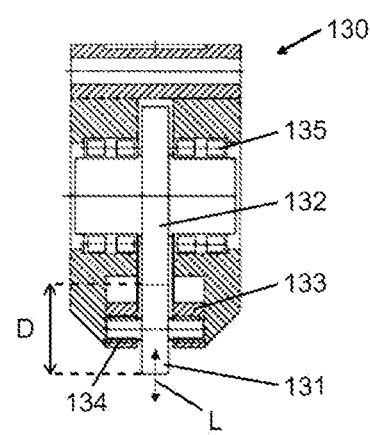
FIG. 9b is a schematic, cross-sectional, detail view of a roll stand of the rolling apparatus according to FIG. 8.

A cross section through the roll stand 130 is shown in FIG. 9*b*. The roll stand 130 comprises a primary roll 131 and at least one secondary roll 132 in order to apply the rolling forces via rolling bearings 135 of the secondary roll 132. The rolling bearings 135 (e.g. double-row cylinder roller bearings) of the secondary roll 132 are used to transmit the rolling force from the roll stand 130 to the secondary roll 132. The primary roll 131 is mounted by way of guide bearings 133, 134 so as to be displaceable in the load direction L in the roll stand 130. The guide bearings 133, 134 may for example be in the form of rolling and/or plain bearings and be used to guide the primary roll 131 with regard to displacements in the load direction L and during rolling in the direction of the rolling bearing raceway 2.

Preferably, the primary roll 131 and the secondary roll 132 are hardened. The primary roll 131 has a diameter in the range of 8 to 25 times the surface hardening depth Rht. The secondary roll 132 preferably has a diameter that is at least twice as large as that of the primary roll 131. For example, with the rolling apparatus 100 illustrated in FIGS. 7 to 9 and a primary roll 131 with a diameter of 100 mm and a width of 30 mm, at a rolling force of approx. 255 kN, a surface pressure of 2530 MPa is achieved and the aforementioned criteria a) to d) are satisfied.

With the aid of the method described above and by means of the rolling apparatus 100, it is preferably possible to process the rolling bearing raceways of rotor bearings for wind turbines, comprising at least one row of tapered or cylinder rollers.

LIST OF REFERENCE DESIGNATIONS

1 Rolling bearing ring element
2 Rolling bearing raceway
3 Roll
4 Rolling contact
5 Lateral surface
6 Peripheral region
7 Change in surface structure
8 Rolled rolling bearing raceway
9 Rolled and machined rolling bearing raceway
10 Roller bearing
20 Rolling bearing ring 21, 22 Partial rings
23, 24 Fastening screws
30 Rolling bearing ring
40 Roller row
50 Oversize roller
51 Radial oversize
52, 53, 54 Partial regions
60 Turntable
65 First plate
70 Bracket
75 Second plate
100 Rolling apparatus
110 Support apparatus
111, 112 Supporting rolls
120 Yoke
121, 122 Tension rods
123 Closed frame
124 Screw drive
125 Hydraulic cylinder
126 Bolt connection
130 Roll stand
131 Primary roll
132 Secondary roll
133, 134 Guide bearings
135 Rolling bearing
140 Drive
150 Base plate
160 Support bracket
b Width of rolling contact
B Width of rolling bearing raceway
D Diameter
ES Residual stresses before the hard rolling
ES' Residual stresses after the hard rolling
K Unhardened core region
KF Force flow
L Load direction
LS Load stresses
LES Combined load and residual stresses
P Surface pressure
R Depth/surface distance
Ra Outer layer
Rht Surface hardening depth
RK Depth of the beginning of the core region
Rmax Depth of maximum residual stresses
S Yield strength
T Transition region
Z Tensile strength
σ Equivalent stress

What is claimed is:

1. A method for increasing a load capacity of a surface-hardened rolling bearing raceway of a rolling bearing ring element, the method comprising:
providing a rolling bearing ring element that has an unhardened core region and, at least in certain portions, an outer layer hardened to a surface hardening depth, with a rolling bearing raceway being formed in a region of the hardened outer layer;
hard rolling the rolling bearing raceway with a roll, wherein a diameter of the roll is 8 to 25 times the surface hardening depth, wherein a surface pressure prevailing in a rolling contact between the roll and the rolling bearing raceway during the hard rolling is between 2000 MPa and 3300 MPa; and
machining the rolling bearing raceway after the hard rolling.

2. The method of claim 1 wherein the surface pressure in the rolling contact is controlled such that load stresses brought about in the unhardened core region are at most 0.9 to 2.0 times a yield strength of the unhardened core region.

3. The method of claim 1 wherein the surface pressure in the rolling contact is controlled such that the hard rolling gives rise to a plastic strain of up to 5% in the unhardened core region.

4. The method of claim 1 wherein the rolling contact has a width of at most ⅔ of a width of the rolling bearing raceway, wherein the method comprises hard rolling the rolling bearing raceway in multiple overlapping paths.

5. The method of claim 1 wherein the roll includes a lateral surface that is convexly curved in longitudinal section at least in peripheral regions of the rolling contact.

6. The method of claim 1 comprising manufacturing the rolling bearing ring element with an allowance at least in a region of the rolling bearing raceway.

7. The method of claim 1 wherein the rolling bearing ring element is one of numerous rolling bearing ring elements, each of which having undergone the providing, the hard rolling, and the machining, wherein rolling bearing rings of a roller bearing are provided as the rolling bearing ring elements, the method comprising assembling the roller bearing for hard rolling by introducing a roller row between the rolling bearing rings, wherein the roller row comprises an oversized roller with a radial oversize as the roll, wherein the surface pressure is introduced into the roller bearing by an axially acting load or a radially acting load.

8. The method of claim 7 wherein the roller row is fully occupied with rollers to improve dimensional accuracy of the rolling bearing rings during the hard rolling.

9. The method of claim 7 wherein the roller bearing includes at least two roller rows, wherein at least one of the rolling bearing rings has at least two partial rings that are configured to be braced axially against one another for enclosing the at least two roller rows between the rolling bearing rings in a positively locking manner, wherein the surface pressure is introduced by the axially acting load that is applied by axial bracing of the at least two partial rings against one another.

10. The method of claim 7 wherein at least three oversize rollers are inserted as rolls into the roller bearing so as to be distributed over a circumference of the rolling bearing raceway.

11. The method of claim 10 wherein the at least three oversize rollers are radially oversized on different, overlapping partial regions of a width of the rolling bearing raceway.

\* \* \* \* \*